United States Patent
Cho et al.

(10) Patent No.: US 11,481,153 B2
(45) Date of Patent: Oct. 25, 2022

(54) DATA STORAGE DEVICE AND OPERATING METHOD THEREOF

(71) Applicant: SK hynix Inc., Gyeonggi-do (KR)

(72) Inventors: Dong Hyun Cho, Gyeonggi-do (KR); Yeong Dong Gim, Gyeonggi-do (KR); Jee Yul Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 120 days.

(21) Appl. No.: 17/011,381

(22) Filed: Sep. 3, 2020

(65) Prior Publication Data
US 2021/0373810 A1 Dec. 2, 2021

(30) Foreign Application Priority Data

May 29, 2020 (KR) ........................ 10-2020-0065312

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0679* (2013.01); *G06F 12/0253* (2013.01); *G06F 2212/1044* (2013.01)

(58) Field of Classification Search
CPC .... G06F 3/0659; G06F 3/0604; G06F 3/0679; G06F 12/0253; G06F 2212/1044; G06F 2201/81; G06F 11/073; G06F 11/076; G06F 11/0793; G06F 11/1048; G06F 2212/1032; G06F 2212/7201; G06F 2212/7203; G06F 2212/7204; G06F 2212/7208; G06F 12/0246; G06F 3/0632; G06F 3/0653; G06F 3/0658; G06F 11/1441
USPC ............... 714/4.2; 713/2; 711/166, 103, 202
See application file for complete search history.

(56) References Cited

U.S. PATENT DOCUMENTS

| | | | | |
|---|---|---|---|---|
| 7,188,225 | B1 * | 3/2007 | Therene | G06F 11/1441 |
| | | | | 714/E11.138 |
| 8,572,310 | B2 * | 10/2013 | Oh | G06F 16/1847 |
| | | | | 711/E12.002 |
| 2016/0042810 | A1 * | 2/2016 | Lee | G11C 29/4401 |
| | | | | 714/723 |
| 2018/0004591 | A1 * | 1/2018 | Volentine | G06F 11/0787 |

FOREIGN PATENT DOCUMENTS

| | | |
|---|---|---|
| KR | 10-0122339 | 11/1997 |
| KR | 10-1283809 | 7/2013 |
| KR | 10-1658485 | 9/2016 |

* cited by examiner

*Primary Examiner* — Andrew J Cheong
(74) *Attorney, Agent, or Firm* — IP & T Group LLP

(57) ABSTRACT

A data storage device may include a nonvolatile memory device, and a controller configured to increase an assert count, when a malfunction occurs while an operation for a command received from a host device is executed, the assert count representing the number of times the malfunction has occurred, and execute a flash translation layer (FTL) resetting operation in a read-dedicated mode in response to an initialization request from the host device when the assert count is greater than or equal to a reference value.

17 Claims, 12 Drawing Sheets

FIG. 4

ITEMS OF SECOND SYSTEM TABLE

| DUMP: MEMORY CONTENTS DUMP | REGISTER | CAUSE OF ASSERT DUMP | ASSERT COUNT | Assert Flag | ... |

DATA STORAGE DEVICE AND OPERATING METHOD THEREOF

CROSS-REFERENCE TO RELATED APPLICATION

The present application claims priority under 35 U.S.C. § 119(a) to Korean application number 10-2020-0065312, filed on May 29, 2020, in the Korean Intellectual Property Office, which is incorporated herein by reference in its entirety.

BACKGROUND

1. Technical Field

Various embodiments generally relate to a semiconductor device, and more particularly, to a data storage device and an operating method thereof.

2. Related Art

A data storage device using a memory device has advantages in that it has excellent stability and durability because it does not have a mechanical driver and has very high information access speed and low power consumption. Examples of data storage devices having such advantages include a universal serial bus (USB) memory device, a memory card having various interfaces, a universal flash storage (UFS) device, and a solid state drive (SSD).

If a storage device is no longer able to perform a normal operation due to malfunction, such as bit flips (or changes) in a static random access memory (SRAM) or a NAND uncorrectable ECC (UECC), the storage device may be in a stuck state.

Thereafter, a host device attempts to initialize the storage device in the stuck state, but even repeated attempts to initialize fail because the underlying cause of the malfunction has not been fixed. As a result, the storage device may become unusable. Accordingly, all data previously stored in the unusable storage device may be lost because the host device cannot access the stored data therein.

Furthermore, when the host device repeatedly attempts initialization for the storage device, a state of a flash translation layer (FTL) in the storage device may not be preserved because only initialization attempt information remains in the storage device.

Accordingly, FTL state information for fail analysis of the storage device as a result of the malfunction may not be obtained.

SUMMARY

Various embodiments are directed to a data storage device, which enables an initialization attempt item to be selectively selected when a malfunction occurs in the data storage device and read service to be provided to a host device, and an operating method thereof.

In an embodiment, a data storage device may include a nonvolatile memory device; and a controller configured to increase an assert count, when a malfunction occurs while an operation for a command received from a host device is executed, the assert count representing the number of times the malfunction has occurred, and execute a flash translation layer (FTL) resetting operation in a read-dedicated mode in response to an initialization request from the host device when the assert count is greater than or equal to a reference value.

In an embodiment, an operating method of a data storage device may include monitoring whether a malfunction has occurred, while an operation for a command received from a host device is performed; increasing an assert count; and performing a resetting operation in response to an initialization request received from the host device, wherein the performing of the resetting operation comprises: performing a flash translation layer (FTL) resetting operation in a read-dedicated mode when the assert count is greater than or equal to a reference value as the malfunction is repeated, and performing the FTL resetting operation in a normal mode when the assert count is less than the reference value.

In an embodiment, a memory system may include a memory device; and a controller configured to: monitor whether malfunction has occurred while an operation on the memory device is performed; compare the number of times the malfunction has occurred with a reference number of times; perform a simplified flash translation layer (FTL) resetting operation, when it is determined that the malfunction has occurred at least the reference number of times; and perform a normal FTL resetting operation, when it is determined that the malfunction has occurred less than the reference number of times, wherein the simplified FTL resetting operation includes skipping at least one of dummy write, map update, reprogram and initial garbage collection.

BRIEF DESCRIPTION OF THE DRAWINGS

FIG. 4 is a diagram illustrating the items of a second system table according to an embodiment.

DETAILED DESCRIPTION

Hereinafter, embodiments are described with reference to the accompanying drawings. Throughout the specification, reference to "an embodiment," "another embodiment" or the like is not necessarily to only one embodiment, and different references to any such phrase are not necessarily to the same embodiment(s). The term "embodiment" when used herein does not necessarily refer to all embodiments.

Figure 1:
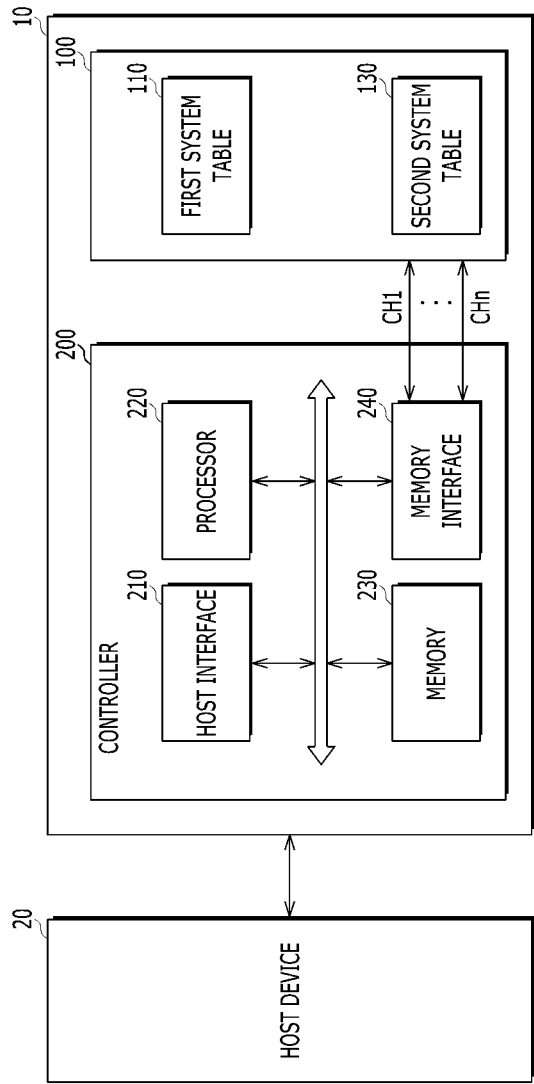
FIG. 1 is a diagram illustrating a configuration of a data storage device according to an embodiment.
Figure 2:
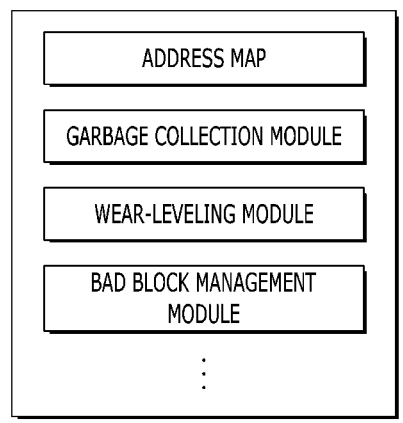
FIG. 2 is a diagram conceptually illustrating a flash translation layer (FTL) according to an embodiment.

FIG. 1 is a diagram illustrating a configuration of a data storage device 10 according to an embodiment. FIG. 2 is a diagram conceptually illustrating a flash translation layer (FTL) according to an embodiment.

Figure 3:
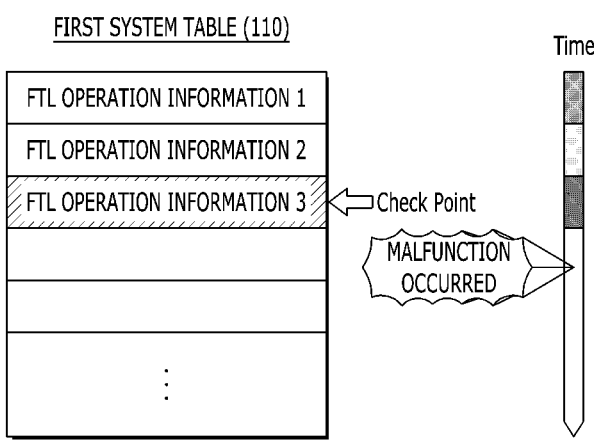
FIG. 3 is a diagram illustrating an example of a first system table according to an embodiment.
Figure 5:
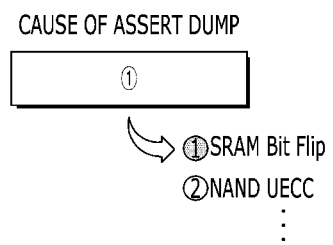
FIG. 5 is a diagram for particularly describing some of the items of the second system table illustrated in FIG. 4.

The data storage device 10 and the FTL are described below with reference to FIGS. 3 to 5. FIG. 3 is a diagram illustrating an example of a first system table according to an embodiment. FIG. 4 is a diagram illustrating the items of a second system table according to an embodiment. FIG. 5 is a diagram for particularly describing some of the items of the second system table illustrated in FIG. 4.

Referring to FIG. 1, the data storage device 10 may store data accessed by a host device 20, such as a mobile phone, an MP3 player, a laptop computer, a desktop computer, a game machine, TV, or an in-vehicle infotainment system. The data storage device 10 may be called a memory system.

The data storage device 10 may be fabricated or configured as any of various types of storage devices according to an interface protocol used to communicate with the host device 20. For example, the data storage device 10 may be configured as any of various types of storage devices, such as a solid state drive (SSD), MMC, eMMC, RS-MMC, and micro-MMC type multimedia cards, SD, mini-SD, and micro-SD type secure digital cards, a universal serial bus (USB) storage device, a universal flash storage (UFS) device, a personal computer memory card international association (PCMCIA) card type storage device, a peripheral component interconnection (PCI) card type storage device, a PCI-express (PCI-e or PCIe) card type storage device, a compact flash (CF) card, a smart media card, and/or a memory stick.

The data storage device 10 may be fabricated in any of various types of packages. For example, the data storage device 10 may be fabricated as a package on package (POP), a system in package (SIP), a system on chip (SOC), a multi chip package (MCP), a chip on board (COB), a wafer-level fabricated package (WFP), and/or a wafer-level stack package (WSP).

The data storage device 10 may include a nonvolatile memory device 100 and a controller 200.

When a malfunction occurs while the controller 200 executes an operation for a command received from the host device 20, the controller 200 may store, in the nonvolatile memory device 100, an assert dump (or information thereon) and a current state of the FTL in which the assert dump has occurred, and may count the number of assert dumps that have occurred to generate an assert count. When the assert count is greater than or equal to a reference value as the malfunction repeatedly occurs, the controller 200 may perform an FTL resetting operation in a read-dedicated mode in response to an initialization request from the host device 20.

The aforementioned malfunction may be defined as an error, such as a bit flip in an SRAM or a NAND UECC, which may occur when an FTL operation for a command received from the host device 20 is performed.

In the present embodiment, the term "assert" may mean an error state occurring when an FTL function is performed. The term "assert dump" may mean that information stored in a memory 230 for an FTL function being executed due to the occurrence of an error of the FTL function being executed is stored in the nonvolatile memory device 100. In this case, the memory 230 may be a volatile memory, such as a static random access memory (SRAM), but the present invention is not limited thereto.

The controller 200 may control overall operation of the data storage device 10 through the driving of firmware or software loaded onto the memory 230. The controller 200 may decode and drive an instruction or algorithm in a code form, such as firmware or software. The controller 200 may be implemented as hardware or as a combination of hardware and software.

The controller 200 may include a host interface 210, a processor 220, the memory 230 and a memory interface 240. Although not illustrated in FIG. 1, the controller 200 may further include an error correction code (ECC) engine for generating parity by ECC-encoding write data provided by the host device 20 and ECC-decoding read data read from the nonvolatile memory device 100 using the parity. The ECC engine may be provided within or external to the memory interface 240.

The host interface 210 may interface between the host device 20 and the data storage device 10 in accordance with the protocol of the host device 20. For example, the host interface 210 may communicate with the host device 20 through any of universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI), and/or PCI express (PCI-e) protocols.

The processor 220 may store, in a first system table 110 of the nonvolatile memory device 100 to be described later, FTL operation information generated as a function of the FTL is executed. The FTL operation information may mean information for executing various functions of the FTL. In this case, the FTL operation information stored in the first system table 110 may include all pieces of information related to an FTL operation, such as FTL function information, map information, information indicating invalidity or validity of data for each block, erase count information, and read count information.

The FTL may be stored in the memory 230. The FTL may be software driven by the processor 220. The processor 220 may control a specific operation of the nonvolatile memory device 100 by driving the FTL, and may provide information regarding device compatibility to the host device 20. The host device 20 may recognize and use the data storage device 10 as a common storage device, such as a hard disk, through the driving of the FTL. The FTL may include modules for performing various functions.

The FTL may be stored in a system region of the nonvolatile memory device 100, and may be read from that system region and stored in the memory 230 while the data storage device 10 is booted up. Furthermore, meta data for the driving of various modules in the FTL may be stored in the memory 230.

Referring to FIG. 2, the FTL may include an address map, a garbage collection module, a wear-leveling module, and a bad block management module. In addition, the FTL may include various other function modules, such as a read module, a write module, and an erase module. The function modules in the FTL may be executed under the control of the processor 220.

Furthermore, the processor 220 may store, in a second system table 130 of the nonvolatile memory device 100, information which is stored in the memory 230 and related to an operation, function or module of the FTL that is being executed when a malfunction occurs, and a current state of the FTL in which an assert dump has occurred, and may count the number of assert dumps that have occurred to generate an assert count.

Referring to FIG. 4, the second system table 130 may include dump information (i.e., memory contents dump) and register information stored in the memory 230 and related to an operation or module of the FTL that is being executed when a malfunction occurs.

Additionally, the second system table 130 may include the current state of the FTL in which an assert dump has occurred, the current state including the cause of the assert dump, an assert count, and an assert flag indicating whether a mode is a read-dedicated mode. Referring to FIG. 5, the cause of assert dump may have a form in which a number previously matched for each cause is stored. For example, if the cause of the assert dump is an SRAM bit flip (i.e., a bit flip in an SRAM) ①, as opposed to a NAND UECC ②, when a malfunction occurs due to an SRAM bit flip, the processor 220 may store ① in the item of the cause of the assert dump.

As described below, the stored cause of assert dump may be associated with an assert count for that cause. That is, data/information associated with each assert dump cause may be maintained separately.

The processor 220 may check the cause of previous assert dump stored in the second system table 130 before incrementing an assert count for the current assert dump cause. The processor 220 may increase the assert count when an assert dump has occurred due to the same cause as the cause of the previous assert dump as a result of the check.

For example, when an assert dump has occurred due to a bit flip in SRAM, the processor 220 may check the cause of previous assert dump stored in the second system table 130, and may increase an assert count by 1 (i.e., +1) when the cause of the present assert dump is the same as the cause of the previous assert dump, i.e., both were caused by a bit flip in SRAM.

When the assert count for a particular assert dump cause is greater than or equal to a reference value, the processor 220 may generate a read-dedicated mode flag and store the read-dedicated mode flag in the second system table 130.

The flag is capable of distinguishing between the read-dedicated mode flag and a normal mode flag, and the processor 220 may store the read-dedicated mode flag in the assert flag field of the second system table 130.

Upon execution of an FTL resetting operation in the read-dedicated mode, the processor 220 may skip performing an FTL write operation in the nonvolatile memory device 100.

For example, the write operation that may be skipped by the processor 220 includes a map update, dummy write, a reprogram, or garbage collection among the FTL operations.

Upon execution of an FTL resetting operation in the read-dedicated mode, the processor 220 may perform an FTL resetting operation based on the last FTL operation information prior to a malfunction among pieces of FTL operation information stored in the first system table 110. In this case, the FTL resetting operation in the read-dedicated mode is executed in order to prevent an assert from occurring again during the execution of initialization by skipping a write operation, such as a map update or garbage collection, which may trigger another assert to occur. Accordingly, the initialization of the data storage device 10 may be completed so that the FTL state may return to the last check point (e.g., a check point in FIG. 3) before the malfunction occurs.

Referring to FIG. 3, the processor 220 may perform an FTL resetting operation using the last FTL operation information (i.e., information 3) as a check point based on malfunction occurrence timing among first FTL operation information (i.e., information 1), second FTL operation information (i.e., information 2) and third FTL operation information (i.e., information 3), which are stored in the first system table 110.

Upon execution of an FTL resetting operation in the read-dedicated mode, the processor 220 may set a write protect mode in which only an operation for a read command among commands requested by the host device 20 is performed.

After an initialization procedure is completed through the processor 220, the host device 20 may attempt to control the data storage device 10 by transmitting various commands to the data storage device 10. When an operation of updating FTL information, such a map update, occurs within the data storage device 10 due to the occurrence of write, a phenomenon in which a malfunction repeatedly occurs may occur. The aforementioned write protect mode may be a mode for preventing a malfunction which may occur again after the initialization procedure of the data storage device 10 is completed.

In the write protect mode, when a write command is received from the host device 20, the processor 220 may skip execution of the write command and then transmit a write protection error to the host device 20. In this case, the processor 220 may transmit the write protection error to the host device 20 without writing data for the write command from the host device 20 so that the host device 20 may recognize that the data storage device 10 is in a write protection state.

When the write protect mode has been set, the processor 220 may skip all operations of updating FTL operation information which may be autonomously generated within the data storage device 10 without a command from the host device 20. For example, such autonomously generated FTL operation information may be for a background garbage collection (GC) and/or a read reclaim. In the write protect mode, FTL operation information for these operations may not be updated.

In such a case, the data storage device 10 cannot perform an operation for a write command from the host device 20, but can perform an operation for a read command from the host device 20. Accordingly, a read service for data previously written by the host device 20 may be performed based on an initialized FTL state.

Furthermore, in an embodiment a fail analysis sample may be obtained because a write operation for the nonvolatile memory device 100 is skipped upon execution of an FTL resetting operation in the read-dedicated mode. Specifically, according to an embodiment, only an initialization history is stored in a system table due to multiple initialization from the host device 20 when a malfunction occurs as a result of skipping the write operation for the nonvolatile memory device 100. Accordingly, a fail analysis sample may be provided because a phenomenon in which FTL operation information is not preserved when malfunction first occurs can be prevented. That is, the FTL is preserved.

The processor 220 may be configured as a micro control unit (MCU) or a central processing unit (CPU). The processor 220 may process a request from the host device 20. In order to process the request from the host device 20, the processor 220 may drive an instruction or algorithm in code form loaded onto the memory 230, that is, firmware, and may control operations of internal elements, such as the host interface 210, the memory 230 and the memory interface 240, and the nonvolatile memory device 100.

The processor 220 may generate control signals for controlling an operation of the nonvolatile memory device 100 based on requests from the host device 20. Further, the processor 220 may provide the generated control signals to the nonvolatile memory device 100 through the memory interface 240.

The memory 230 may include a static random access memory (SRAM) or a dynamic random access memory (DRAM). The memory 230 may store firmware driven by the processor 220. Furthermore, the memory 230 may store data for the driving of firmware, for example, meta data. That is, the memory 230 may operate as a working memory of the processor 220. Although not illustrated in FIG. 1, the controller 200 may further include a processor-dedicated memory positioned adjacent to the processor 220. Firmware and meta data stored in the memory 230 may be loaded onto the processor-dedicated memory.

The memory 230 may be configured to include a data buffer for temporarily storing write data to be transmitted from the host device 20 to the nonvolatile memory device 100 or read data to be read from the nonvolatile memory device 100 and be then transmitted to the host device 20. That is, the memory 230 may operate as a buffer memory.

As shown in FIG. 1, the memory 230 is included within the controller 200. However, in another embodiment, the memory 230 may be provided external to the controller 200.

The memory interface 240 may control the nonvolatile memory device 100 under the control of the processor 220. If the nonvolatile memory device 100 is configured as a NAND flash memory, the memory interface 240 may also be called a flash control top (FCT). The memory interface 240 may transmit, to the nonvolatile memory device 100, control signals generated by the processor 220. The control signals may include a command, an address, and an operation control signal for controlling an operation of the nonvolatile memory device 100. By way of example but not limitation, the operation control signal may include a chip enable signal, a command latch enable signal, an address latch enable signal, a write enable signal, a read enable signal, and a data strobe signal, but the present invention is not limited thereto. Furthermore, the memory interface 240 may transmit write data to the nonvolatile memory device 100 or may receive read data from the nonvolatile memory device 100.

The memory interface 240 and the nonvolatile memory device 100 may be coupled through a plurality of channels CH1 to CHn. The memory interface 240 may transmit signals, such as a command, an address, an operation control signal, and data (i.e., write data), to the nonvolatile memory device 100 through the plurality of channels CH1 to CHn. Furthermore, the memory interface 240 may receive a status signal (e.g., ready/busy) and data (i.e., read data) from the nonvolatile memory device 100 through the plurality of channels CH1 to CHn.

The nonvolatile memory device 100 may operate as a storage medium of the data storage device 10. The nonvolatile memory device 100 may be configured as any of various types of nonvolatile memory devices, such as a NAND flash memory device, a NOR flash memory device, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and/or a resistive random access memory (ReRAM) using transition metal oxide, depending on the type of memory cells in the memory device 100.

The nonvolatile memory device 100 may include a memory cell array (not illustrated) having a plurality of memory cells disposed in respective regions in which a plurality of bit lines (not illustrated) and a plurality of word lines (not illustrated) intersect. For example, each of the memory cells of the memory cell array may be a single level cell (SLC) capable of storing one bit of data, a multi-level cell (MLC) capable of storing 2 bits of data, a triple level cell (TLC) capable of storing 3 bits of data or a quadruple level cell (QLC) capable of storing 4 bits of data. The memory cell array may include memory cells of at least one of these types. Also, the memory cells of the memory cell array may have a two-dimensional horizontal structure or a three-dimensional vertical structure.

In some embodiments, the nonvolatile memory device 100 may include the first system table 110 and the second system table 130.

The first system table 110 may store FTL operation information. The FTL operation information may mean information for executing various functions of the FTL. For example, the FTL operation information may include all of pieces of information related to an FTL operation, such as FTL function information, map information, information indicating invalidity or validity of data for each block, erase count information, and read count information.

The second system table 130 may store an assert dump and a current state in which the assert dump has occurred.

Referring to FIG. 4, the second system table 130 may include dump information (i.e., memory contents dump) and register information stored in the memory 230 and related to an FTL that is being executed when a malfunction occurs. Additionally, the second system table 130 may include a current state in which an assert dump has occurred, the current state including the cause of the assert dump, an assert count, and an assert flag indicating whether a mode is a read-dedicated mode. Referring to FIG. 5, the cause of assert dump may have a form in which a number previously matched for each cause is stored. For example, among the cause ① of assert dump is an SRAM bit flip and the cause ② of assert dump is a NAND UECC, when a malfunction occurs due to an SRAM bit flip, the processor 220 may store ① in the item of the cause of the assert dump.

Since a fixed physical address is assigned to the second system table 130, the processor 220 may check information stored in the second system table 130 by accessing the second system table 130 based on the physical address of the second system table 130 previously recognized by the processor 220. For example, the processor 220 may check information by accessing the most recently stored region among the regions of the second system table 130. The second system table 130 may secure a region in which data may be stored, through an erase operation, if necessary, because the region of the second system table 130 in which data may be stored is smaller than that of the first system table 110.

Figure 6:
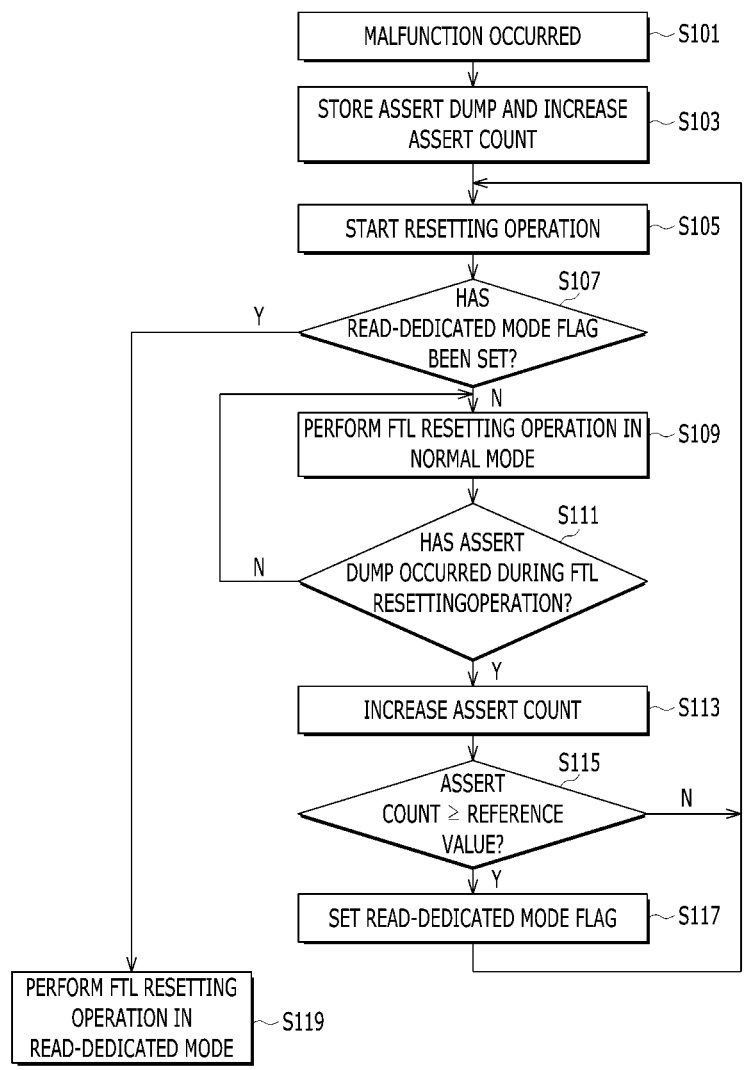
FIG. 6 is a flowchart illustrating an operating method of a data storage device according to an embodiment.

FIG. 6 is a flowchart illustrating an operating method of the data storage device 10 according to an embodiment.

First, a malfunction may occur (S101) while the data storage device 10 executes an operation for a command received from the host device 20.

The data storage device 10 may store, in the nonvolatile memory device 100, an assert dump and a current state of the FTL in which the assert dump has occurred (S103).

Specifically, the nonvolatile memory device 100 may include the first system table 110 in which FTL operation information is stored and the second system table 130 in which an assert dump and a current state in which the assert dump has occurred are stored.

The data storage device 10 may store, in the second system table 130 of the nonvolatile memory device 100, information which is stored in the memory 230 and related to an operation of the FTL that is being executed when a malfunction occurs, and a current state of the FTL in which an assert dump has occurred.

Further, the data storage device 10 may increase an assert count representing the number of times an assert dump associated with the particular cause of the assert dump has occurred (S103).

Next, the data storage device 10 may start a resetting operation in response to an initialization request from the host device 20 (S105).

In operation S105, the data storage device 10 may perform an FTL resetting operation in the read-dedicated mode when the assert count is greater than or equal to a reference value, indicating that the malfunction occurred more than the reference value number of times. When the assert count is less than the reference value, the data storage device 10 may perform an FTL resetting operation in the normal mode.

Next, the data storage device 10 may check whether a read-dedicated flag has been set, by checking information stored in the second system table 130 of the nonvolatile memory device 100 (S107).

When it is determined, as a result of the check, that the read-dedicated flag has not been set, the data storage device 10 may perform the FTL resetting operation in the normal mode (S109).

When it is determined that an assert dump has occurred during the FTL resetting operation in the normal mode (S111, Y), the data storage device 10 may increase the assert count (S113).

Although not illustrated, between operations S111 and S113, the data storage device 10 may identify a cause of previous assert dump stored in the second system table 130. Further, the data storage device 10 may increase the assert count when the cause of the current assert dump is the same as the cause of the previous assert dump.

Next, the data storage device 10 may check whether the assert count is greater than or equal to a reference value (S115). When it is determined, via the check, that the assert count is greater than or equal to the reference value, the data storage device 10 may generate a read-dedicated mode flag, i.e., set the read-dedicated mode flag, and store the read-dedicated mode flag in the second system table 130 (S117).

When, as a result of the check in operation S107, it is determined that the read-dedicated flag has been set, the data storage device 10 may perform the FTL resetting operation in the read-dedicated mode (S119).

When it is determined that an assert dump has not occurred during the FTL resetting operation in the normal mode (S111, N), the data storage device 10 may continue to perform the FTL resetting operation in the normal mode (S109).

Figure 7:
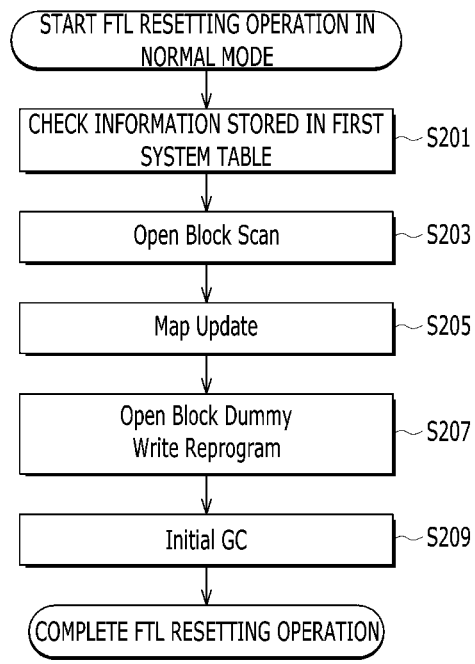
FIG. 7 is a flowchart illustrating a method of resetting a normal mode in FIG. 6.

FIG. 7 is a flowchart illustrating a method of resetting the normal mode in FIG. 6. With reference to FIG. 7 operation S109 of FIG. 6 is described in detail.

Referring to FIG. 7, the data storage device 10 may check the last FTL operation information prior to a malfunction among pieces of FTL operation information by checking the first system table 110 (S201). Operation S201 may be a procedure for performing, by the data storage device 10, an FTL resetting operation based on the last FTL operation information prior to a malfunction.

Next, the data storage device 10 may perform an FTL resetting operation, including an open block scan operation (S203), a map update operation (S205), an open block dummy write & reprogram (S207) and an initial GC operation (S209).

Figure 8:
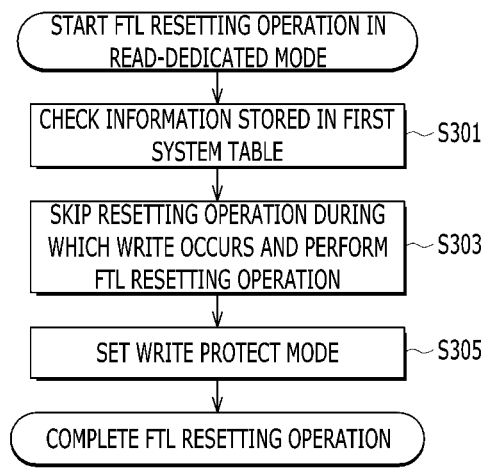
FIG. 8 is a flowchart illustrating a method of resetting a read-dedicated mode in FIG. 6.

FIG. 8 is a flowchart illustrating a method of resetting the read-dedicated mode in FIG. 6. With reference to FIG. 8, operation S119 in FIG. 6 is described in detail.

Referring to FIG. 8, when executing the FTL resetting operation in the read-dedicated mode, the data storage device 10 may check the last FTL operation information prior to a malfunction among pieces of FTL operation information by checking the first system table 110 (S301).

In the illustrated example of FIG. 3, the data storage device 10 may start the FTL resetting operation in the read-dedicated mode using the last FTL operation information (i.e., information 3 in FIG. 3) as a check point based on malfunction occurrence timing among all of the FTL operation information, i.e., FTL operation information 1, 2 and 3, stored in the first system table 110.

Next, the data storage device 10 may skip a resetting operation during which writing may occur in the nonvolatile memory device 100, and may perform an FTL resetting operation in the read-dedicated mode (S303).

For example, a map update, dummy write, a reprogram, or garbage collection among FTL operations is an operation during which writing may occur in the nonvolatile memory device 100. The data storage device 10 may skip such an operation.

Next, when executing the FTL resetting operation in the read-dedicated mode, the data storage device 10 may set a write protect mode in which only an operation for a read command among commands requested by the host device 20 is performed (S305).

Although not illustrated, after operation S305, when the write protect mode has been set, when receiving a write command from the host device 20, the data storage device 10 may skip an operation for the write command and transmit a write protection error to the host device 20.

In this case, the write command may mean all commands capable of generating a write operation on the nonvolatile memory device 100.

Figure 9:
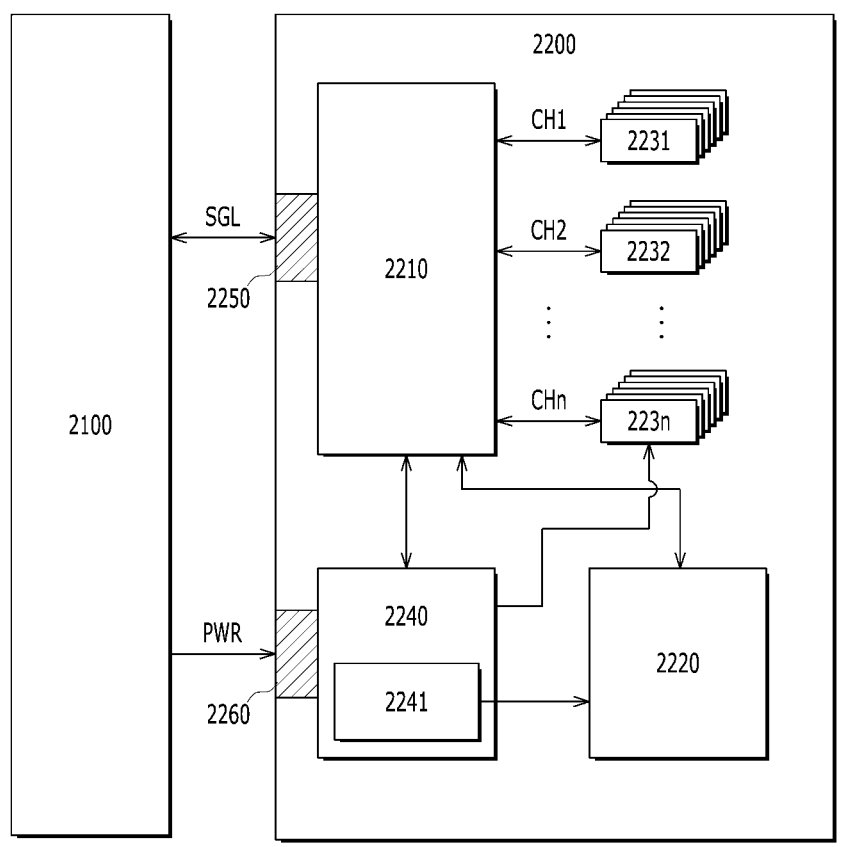
FIG. 9 is a diagram illustrating a data processing system including a solid state drive (SSD) according to an embodiment.

FIG. 9 is a diagram illustrating a data processing system 2000 including a solid state drive (SSD) according to an embodiment. Referring to FIG. 9, the data processing system 2000 may include a host device 2100 and a solid state drive (SSD) 2200.

The SSD 2200 may include a controller 2210, a buffer memory device 2220, nonvolatile memory devices 2231 to 223n, a power supply 2240, a signal connector 2250 and a power connector 2260.

The controller 2210 may control overall operation of the SSD 2200.

The buffer memory device 2220 may temporarily store data to be stored in the nonvolatile memory devices 2231 to 223n. Furthermore, the buffer memory device 2220 may temporarily store data read from the nonvolatile memory devices 2231 to 223n. The data temporarily stored in the buffer memory device 2220 may be transmitted to the host device 2100 or the nonvolatile memory devices 2231 to 223n under the control of the controller 2210.

The nonvolatile memory devices 2231 to 223n may be used as storage media of the SSD 2200. The nonvolatile memory devices 2231 to 223n may be coupled to the controller 2210 through a plurality of channels CH1 to CHn, respectively. In another embodiment, multiple nonvolatile memory devices may be coupled to one channel. The nonvolatile memory devices coupled to the same channel may be coupled the same signal bus and data bus.

The power supply 2240 may provide the SSD 2200 with a power source PWR received through the power connector 2260. The power supply 2240 may include an auxiliary power supply 2241. When sudden power-off occurs, the auxiliary power supply 2241 may supply power to the SSD 2200 so that the SSD 2200 is terminated properly. The auxiliary power supply 2241 may include high-capacity capacitors capable of storing the power source PWR.

The controller 2210 may exchange signals SGL with the host device 2100 through the signal connector 2250. In this case, the signals SGL may include a command, and address, and data. The signal connector 2250 may be configured in any of various forms depending on an interface protocol between the host device 2100 and the SSD 2200.

Figure 10:
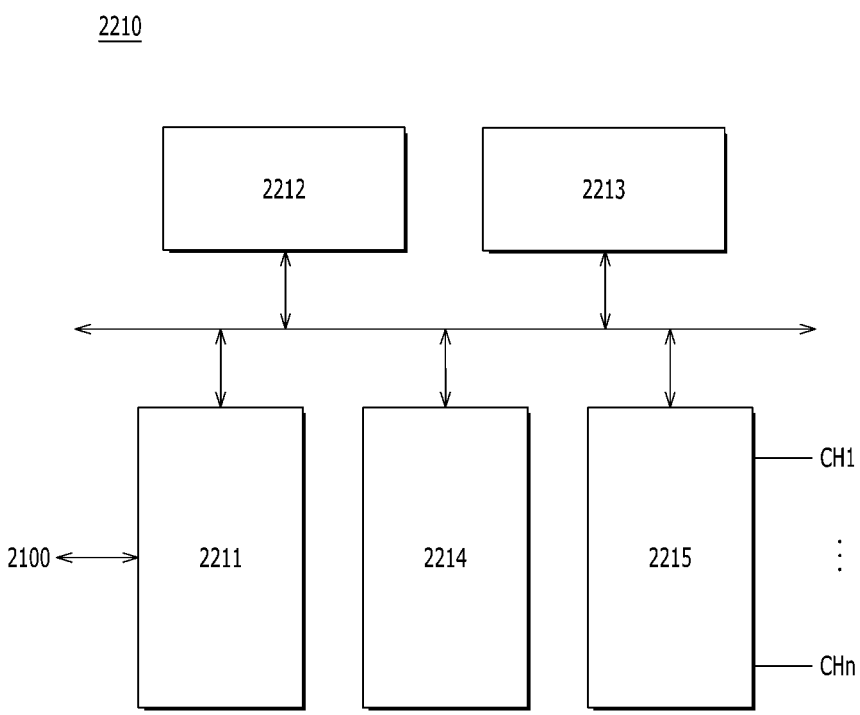
FIG. 10 is a diagram illustrating a configuration of a controller illustrated in FIG. 9.

FIG. 10 is a diagram illustrating a configuration of the controller 2210 illustrated in FIG. 9. Referring to FIG. 10, the controller 2210 may include a host interface 2211, a control component 2212, a RAM 2213, an ECC component 2214 and a memory interface 2215.

The host interface 2211 may interface the host device 2100 and the SSD 2200 based on a protocol of the host device 2100. For example, the host interface 2211 may communicate with the host device 2100 through any one of secure digital, universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-e or PCIe), or universal flash storage (UFS) protocols. Furthermore, the host interface 2211 may perform a disk emulation function that supports the host device 2100 to recognize the SSD 2200 as a general-purpose data storage device, for example, a hard disk drive (HDD).

The control component 2212 may analyze and process the signal SGL received from the host device 2100. The control component 2212 may control operations of internal function blocks based on firmware or software for driving the SSD 2200. The RAM 2213 may be used as a working memory for driving such firmware or software.

The ECC component 2214 may generate the parity data of data to be transmitted to the nonvolatile memory devices 2231 to 223n. The generated parity data, together with the data, may be stored in the nonvolatile memory devices 2231 to 223n. The ECC component 2214 may detect errors of data, read from the nonvolatile memory devices 2231 to 223n, based on parity data. If the detected errors are within a correction range (typically given as a maximum number of correctable errors), the ECC component 2214 may correct the detected errors.

The memory interface 2215 may provide a control signal, such as a command and an address, to the nonvolatile memory devices 2231 to 223n under the control of the control component 2212. Furthermore, the memory interface 2215 may exchange data with the nonvolatile memory devices 2231 to 223n under the control of the control component 2212. For example, the memory interface 2215 may provide the nonvolatile memory devices 2231 to 223n with data stored in the buffer memory device 2220 or may provide the buffer memory device 2220 with data read from the nonvolatile memory devices 2231 to 223n.

Figure 11:
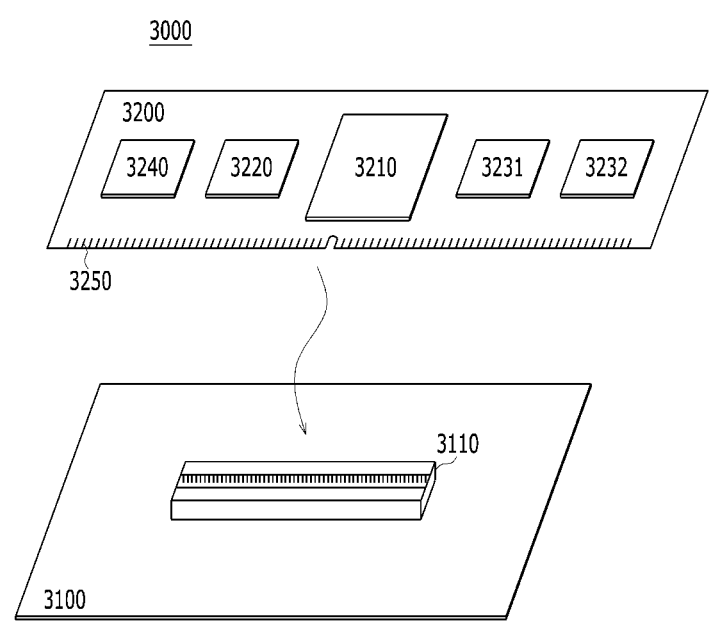
FIG. 11 is a diagram illustrating a data processing system including a data storage device according to an embodiment.

FIG. 11 is a diagram illustrating a data processing system 3000 including a data storage device according to an embodiment. Referring to FIG. 11, the data processing system 3000 may include a host device 3100 and a data storage device 3200.

The host device 3100 may be configured in the form of a board, such as a printed circuit board (PCB). Although not illustrated, the host device 3100 may include internal function blocks for performing functions of the host device 3100.

The host device 3100 may include a connection terminal 3110, such as a socket, a slot or a connector. The data storage device 3200 may be mounted on the connection terminal 3110.

The data storage device 3200 may be configured in the form of a board, such as a PCB. The data storage device 3200 may be called a memory module or a memory card. The data storage device 3200 may include a controller 3210, a buffer memory device 3220, nonvolatile memory devices 3231 and 3232, a power management integrated circuit (PMIC) 3240 and a connection terminal 3250.

The controller 3210 may control overall operation of the data storage device 3200. The controller 3210 may be configured the same as the controller 2210 illustrated in FIG. 10.

The buffer memory device 3220 may temporarily store data to be stored in the nonvolatile memory devices 3231 and 3232.

Furthermore, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 under the control of the controller 3210.

The nonvolatile memory devices 3231 and 3232 may be used as storage media of the data storage device 3200.

The PMIC 3240 may provide the data storage device 3200 with a power source received through the connection terminal 3250. The PMIC 3240 may manage the power source of the data storage device 3200 under the control of the controller 3210.

The connection terminal 3250 may be coupled to the connection terminal 3110 of the host device 3100. Signals, such as a command, an address, and data, and a power source may be exchanged between the host device 3100 and the data storage device 3200 through the connection terminal 3250. The connection terminal 3250 may be configured in any of various forms depending on an interface protocol between the host device 3100 and the data storage device 3200. The connection terminal 3250 may be positioned on or in any side of the data storage device 3200.

Figure 12:
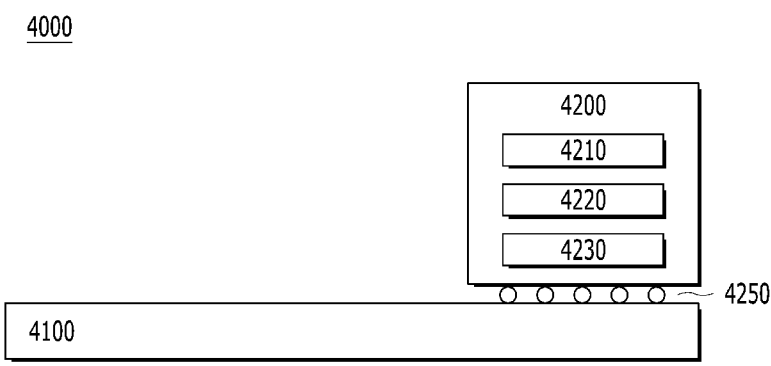
FIG. 12 is a diagram illustrating a data processing system including a data storage device according to an embodiment.

FIG. 12 is a diagram illustrating a data processing system 4000 including a data storage device according to an embodiment. Referring to FIG. 12, the data processing system 4000 may include a host device 4100 and a data storage device 4200.

The host device 4100 may be configured in the form of a board, such as a PCB. Although not illustrated, the host device 4100 may include internal function blocks for performing functions of the host device 4100.

The data storage device 4200 may be configured in a surface mount package form. The data storage device 4200 may be mounted on the host device 4100 through solder balls 4250. The data storage device 4200 may include a controller 4210, a buffer memory device 4220 and a nonvolatile memory device 4230.

The controller 4210 may control overall operation of the data storage device 4200. The controller 4210 may be configured the same as the controller 2210 illustrated in FIG. 10.

The buffer memory device 4220 may temporarily store data to be stored in the nonvolatile memory device 4230. Furthermore, the buffer memory device 4220 may temporarily store data read from the nonvolatile memory device 4230. The data temporarily stored in the buffer memory device 4220 may be transmitted to the host device 4100 or the nonvolatile memory device 4230 under the control of the controller 4210.

The nonvolatile memory device 4230 may be used as a storage medium of the data storage device 4200.

Figure 13:
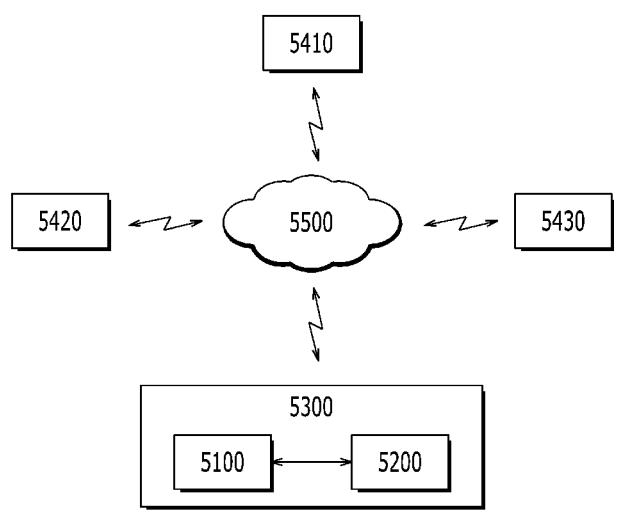
FIG. 13 is a diagram illustrating a network system including a data storage device according to an embodiment.

FIG. 13 is a diagram illustrating a network system 5000 including a data storage device according to an embodiment. Referring to FIG. 13, the network system 5000 may include a server system 5300 and a plurality of client systems 5410, 5420 and 5430 coupled over a network 5500.

The server system 5300 may serve data in response to requests from the plurality of client systems 5410, 5420 and 5430. For example, the server system 5300 may store data provided by the plurality of client systems 5410, 5420 and 5430. For another example, the server system 5300 may provide data to the plurality of client systems 5410, 5420 and 5430.

The server system 5300 may include a host device 5100 and a data storage device 5200. The data storage device 5200 may be configured as the data storage device 10 of FIG. 1, the data storage device 2200 of FIG. 9, the data storage device 3200 of FIG. 11 or the data storage device 4200 of FIG. 12.

Figure 14:
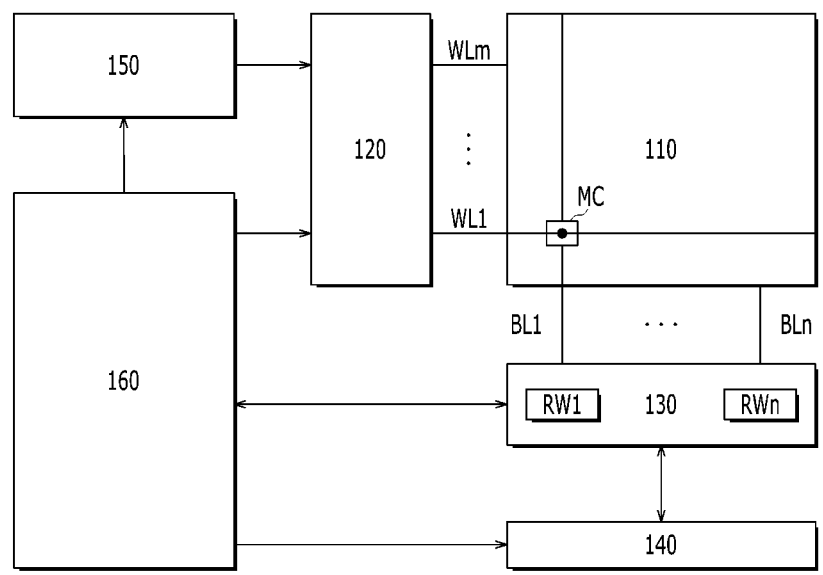
FIG. 14 is a block diagram illustrating a nonvolatile memory device included in a data storage device according to an embodiment.

FIG. 14 is a block diagram illustrating a nonvolatile memory device 100 included in a data storage device according to an embodiment. Referring to FIG. 14, the nonvolatile memory device 100 may include a memory cell array 110, a row decoder 120, a column decoder 130, a data read/write block 140, a voltage generator 150 and control logic 160.

The memory cell array 110 may include memory cells MC arranged at regions in which word lines WL1 to WLm and bit lines BL1 to BLn intersect.

The row decoder 120 may be coupled to the memory cell array 110 through the word lines WL1 to WLm. The row decoder 120 may operate under the control of the control logic 160. The row decoder 120 may decode an address provided by an external device, such as a host device. The row decoder 120 may select and drive the word lines WL1 to WLm based on a result of the decoding. For example, the row decoder 120 may provide the word lines WL1 to WLm with a word line voltage provided by the voltage generator 150.

The data read/write block 140 may be coupled to the memory cell array 110 through the bit lines BL1 to BLn. The data read/write block 140 may include read/write circuits RW1 to RWn corresponding to the bit lines BL1 to BLn, respectively. The data read/write block 140 may operate under the control of the control logic 160. The data read/write block 140 may operate as a write driver or a sense amplifier depending on an operation mode. For example, in a write operation, the data read/write block 140 may operate as the write driver for storing, in the memory cell array 110, data provided by the external device. For another example, in a read operation, the data read/write block 140 may operate as the sense amplifier for reading data from the memory cell array 110.

The column decoder 130 may operate under the control of the control logic 160. The column decoder 130 may decode an address provided by the external device. The column decoder 130 may couple a data input/output line (or data input/output buffer) and the read/write circuits RW1 to RWn of the data read/write block 140 corresponding to the bit lines BL1 to BLn, respectively, based on a result of the decoding.

The voltage generator 150 may generate voltages used for an internal operation of the nonvolatile memory device 100. The voltages generated by the voltage generator 150 may be applied to the memory cells MC of the memory cell array 110. For example, a program voltage generated in a program operation may be applied to a word line corresponding to memory cells on which the program operation will be performed. For another example, an erase voltage generated in an erase operation may be applied to the well region of memory cells on which the erase operation will be performed. For still another example, a read voltage generated in a read operation may be applied to a word line corresponding to memory cells on which the read operation will be performed.

The control logic 160 may control overall operation of the nonvolatile memory device 100 based on a control signal provided by the external device. For example, the control logic 160 may control operations of the nonvolatile memory device 100, such as read, write and erase operations of the nonvolatile memory device 100.

According to embodiments, it is possible to expect an effect in that read service may be provided to a host device because an initialization attempt item is selectively selected and performed when a device malfunction occurs.

The disclosed embodiments are illustrative in all aspects, not limiting, because, as those skilled in the art will understand this disclosure may be implemented in other forms without departing from the spirit and scope of the invention. Accordingly, the scope of the invention is defined by the appended claims rather than by the detailed description. As such, the present invention encompasses all modifications and variations of any of the disclosed embodiments that fall within the scope of the claims.

What is claimed is:

1. A data storage device comprising:
a nonvolatile memory device; and
a controller configured to increase an assert count, when a malfunction occurs while an operation for a command received from a host device is executed, the assert count representing the number of times the malfunction has occurred, and execute a flash translation layer (FTL) resetting operation in a read-dedicated mode in response to an initialization request from the host device when the assert count is greater than or equal to a reference value,
wherein the controller is configured to skip a resetting operation during which writing occurs in the nonvolatile memory device, when executing the FTL resetting operation in the read-dedicated mode.

2. The data storage device according to claim 1, wherein the nonvolatile memory device comprises:
a first system table in which FTL operation information is stored; and
a second system table in which an assert dump and a current state in which the assert dump has occurred are stored when the malfunction occurs.

3. The data storage device according to claim 2, wherein the controller comprises:
a memory; and
a processor configured to store the FTL operation information, which is generated as a function of the FTL is executed, in the first system table, store, in the second system table, information which is stored in the memory and related to the function of the FTL that is being executed when the malfunction occurs, and the current state in which the assert dump has occurred, and increase the assert count.

4. The data storage device according to claim 3, wherein the processor is configured to:
identify a cause of a previous assert dump, which is stored in the second system table, before increasing the assert count, and
increase the assert count when the cause of the assert dump is the same as the cause of the previous assert dump as a result of the identification.

5. The data storage device according to claim 3, wherein the processor is configured to:
generate a read-dedicated mode flag when the assert count is greater than or equal to the reference value, and
store the read-dedicated mode flag in the second system table.

6. The data storage device according to claim 3, wherein the processor is configured to perform the FTL resetting operation based on last FTL operation information prior to the malfunction, among pieces of the FTL operation information stored in the first system table, when executing the FTL resetting operation in the read-dedicated mode.

7. The data storage device according to claim 3, wherein the processor is configured to set a write protect mode in which only an operation for a read command among commands requested by the host device is performed, when executing the FTL resetting operation in the read-dedicated mode.

8. The data storage device according to claim 7, wherein the processor is configured to:
skip an operation for a write command when receiving the write command from the host device, when the write protect mode has been set, and
transmit a write protection error to the host device.

9. An operating method of a data storage device, comprising:
monitoring whether a malfunction has occurred, while an operation for a command received from a host device is performed;
increasing an assert count; and
performing a resetting operation in response to an initialization request from the host device,
wherein the performing of the resetting operation comprises:
performing a flash translation layer (FTL) resetting operation in a read-dedicated mode when the assert count is greater than or equal to a reference value as the malfunction is repeated, and
performing the FTL resetting operation in a normal mode when the assert count is less than the reference value,
wherein the performing of the FTL resetting operation in the read-dedicated mode comprises skipping a resetting operation during which writing occurs in a nonvolatile memory device included in the data storage device.

10. The operating method according to claim 9, wherein the nonvolatile memory device comprises:
a first system table in which FTL operation information is stored; and
a second system table in which an assert dump and a current state in which the assert dump has occurred are stored when the malfunction occurs.

11. The operating method according to claim 10, further comprising storing, in the nonvolatile memory device, the assert dump and the current state in which the assert dump has occurred, between the occurring of the malfunction and the counting of the assert count,
wherein information related to an FTL being executed and stored in a memory and the current state in which the assert dump has occurred are stored in the second system table, when storing the assert dump and the current state.

12. The operating method according to claim 11, further comprising:
identifying a cause of previous assert dump, which is stored in the second system table; and
increasing the assert count when the cause of the assert dump is the same as the cause of the previous assert dump as a result of the identification.

13. The operating method according to claim 10, wherein the performing of the resetting operation further comprises:
generating a read-dedicated mode flag when the assert count is greater than or equal to the reference value, and
storing the read-dedicated mode flag in the second system table.

14. The operating method according to claim 10, wherein the performing of the resetting operation comprises performing the FTL resetting operation based on last FTL operation information prior to the malfunction, among pieces of the FTL operation information stored in the first system table, when executing the FTL resetting operation in the read-dedicated mode.

15. The operating method according to claim 10, wherein the performing of the resetting operation comprises setting a write protect mode in which only an operation for a read command among commands requested by the host device is performed, when executing the FTL resetting operation in the read-dedicated mode.

16. The operating method according to claim 15, further comprising:
after the performing of the resetting operation,
skipping an operation for a write command when receiving the write command from the host device, when the write protect mode has been set, and
transmitting a write protection error to the host device.

17. A memory system comprising:
a memory device; and
a controller configured to:
monitor whether malfunction has occurred while an operation on the memory device is performed;
compare the number of times the malfunction has occurred with a reference number of times;
perform a simplified flash translation layer (FTL) resetting operation, when it is determined that the malfunction has occurred at least the reference number of times; and
perform a normal FTL resetting operation, when it is determined that the malfunction has occurred less than the reference number of times,
wherein the simplified FTL resetting operation includes skipping at least one of dummy write, map update, reprogram and initial garbage collection.

* * * * *